United States Patent [19]

Nihongi et al.

[11] 4,088,620
[45] May 9, 1978

[54] MELAMINE RESIN FLAME-RETARDANT FIBERS

[75] Inventors: Yutaka Nihongi; Nobuo Yasuhira, both of Kurashiki, Japan

[73] Assignee: Kuraray Co., Ltd., Kurashiki, Japan

[21] Appl. No.: 638,098

[22] Filed: Dec. 5, 1975

Related U.S. Application Data

[62] Division of Ser. No. 424,629, Dec. 13, 1973, abandoned.

[30] Foreign Application Priority Data

Dec. 28, 1972 Japan .................................. 45-483856

[51] Int. Cl.$^2$ ...................... C08L 61/28; C08G 12/32

[52] U.S. Cl. ............................. 260/29.4 UA; 260/15; 260/29.4 R; 260/67.6 R; 260/849; 260/850; 260/853; 260/856; 264/176 F; 428/332

[58] Field of Search ....................... 260/856, 29.4 UA; 264/176 F

[56] References Cited

U.S. PATENT DOCUMENTS

| | | | |
|---|---|---|---|
| 2,376,511 | 5/1945 | Saunders et al. | 260/844 |
| 2,810,426 | 10/1957 | Till et al. | 264/24 |
| 2,988,469 | 6/1961 | Watson | 154/101 |

*Primary Examiner*—John C. Bleutge
*Attorney, Agent, or Firm*—Bacon & Thomas

[57] ABSTRACT

Flame-retardant and infusible fibers having a water-swelling degree lower than 2.0, obtained by spinning precondensates of melamine-aldehyde resins and thereafter curing the resulting fibers.

19 Claims, No Drawings

MELAMINE RESIN FLAME-RETARDANT FIBERS

This is a division, of application Ser. No. 424,629, filed Dec. 13, 1973 now abandoned.

BACKGROUND OF THE INVENTION

1. Field of the Invention

The invention relates to new flame-retardant and infusible fibers made from melamine-aldehyde resins.

2. Description of the Prior Art

Recently, in order to prevent fire and disasters, it has been desirable that even ordinary textile goods for general use such as clothes, bedding, curtains, mattings and covers, etc., have flame-retardant properties. If non-flame-retardant textile goods are exposed to fire, the flames will propagate further and may result not only in heavy property loss but also may cause bodily damage or even death. Therefore, to prevent fires and related accidents, the demand for non-combustible or flame-retardant textiles has increased in recent times. In addition to flame-retardant properties, it is also desirable that such textiles be thermally infusible and have low thermal shrinkage.

If textile goods are thermally fusible or highly thermally shrinkable, and are exposed to fire, the flames may spread therethrough very rapidly in view of the spaces caused by fusion or shrinkage near the fire, possibly resulting in bodily damage. Moreover, one may receive burns by contact with the molten polymers or the hot contracted fibers. Therefore, the infusibility of the fibers is of course considered to be an important safety factor.

Furthermore, from the standpoint of preventing disasters in a fire, it is desirable that such textile goods generate as small an amount of smoke or poisonous gas as possible when heated. Of course, the generation of large amounts of smoke and poisonous gas will surely prevent rapid escape and, more significantly, there is a danger of suffocation in such circumstances.

Almost all well-known fibers which are used broadly in various fields for general use, except such special fibers as inorganic fibers, carbon fibers and phenol resin fibers, are very flammable and therefore dangerous. Even if a fiber is flame-retardant, it is normally fusible or thermally shrinkable, or may generate large quantities of smoke and poisonous gas. Thus, given these properties, known flame-retardant fibers are deficient in preventing fire and disasters.

Although inorganic and carbon fibers have desirable flame-retardant properties, they are not generally used in textile goods in view of their many defects in properties necessary for general use, such as their low spinnability and weaveability (due to their low strength and flexibility), large thermal conductivity, low hygroscopicity, bad feel and low dyeability. Moreover, although phenol resin fibers have been attracting attention for their flame-retardant properties, it is difficult to spin and weave such fibers in view of their low strength (i.e., tenacities of 1 - 1.5 g/d), they have a yellow-brown color and are quickly colored by the sun even after being bleached almost white, and further, they have a very poor dyeability. Such properties are totally unacceptable for general use, and therefore phenol resin fibers have not been broadly used in the textile art.

There is a need, therefore, for fibers which are both flame-retardant and have the other properties required for general use in textile goods.

SUMMARY OF THE INVENTION

It is a primary object of the present invention to remedy the above disadvantages and provide a fiber which fulfills the above need.

The fibers of the present invention are not only non-combustible but also thermally infusible and generate only a small amount of smoke and poisonous gas when heated. Accordingly, these fibers satisfy the rigid requirements for flame-retardancy. Furthermore, the fibers of the present invention have the properties necessary for common use such as strength, whiteness, dyeability, etc.

Essentially, the fibers of the present invention are comprised of melamine resins. More specifically, the fibers of the invention are flame-retardant and infusible fibers having a water-swelling degree lower than 2.0, obtained by curing fibers prepared by spinning pre-condensates of melamine-aldehyde.

Other objects and advantages will become apparent from the ensuing description.

DESCRIPTION OF THE PREFERRED EMBODIMENTS

To date, the prior art does not include fibers made from melamine resins. In Japanese patent Publication No. 47-14771 (Register No. 665688), a method of producing a fiber from a mixture of polyvinyl alcohol (PVA) and N-methylol melamine is disclosed. In this mixture, however, since the amount of N-methylol melamine is only in the range of 5 - 20 weight percent, based on the weight of PVA, the resulting fiber is still called a PVA fiber because it is predominantly comprised of PVA. Furthermore, such fibers are flammable and are also thermally shrinkable since they fuse at 300° C. Therefore, they are not flame-retardant fibers in the sense of the present invention. The melamine resin fibers of the present invention are definitely different from the above-mentioned fiber in chemical composition as well as physical properties.

Moreover, a melamine-formaldehyde resin has often been used in a finishing treatment for coating textiles or fabrics. In this case, only a small amount of melamine resin exists adhered on the surface of the fibers constituting the fabrics and such fibers coated with a melamine resin are completely different from the fibers of the present invention which are actually formed of melamine-aldehyde resins.

More specifically, in one embodiment the melamine fibers of the present invention consist essentially of 100% by weight of the melamine-aldehyde resins described below. Of course, minor amounts of impurities may be present in these resins derived, possible from the process used for preparing the same. In another embodiment according to the present invention, the fibers are comprised of melamine-aldehyde resins which are condesned or mixed with other fiber-forming polmers. It is required, however, that fibers of this embodiment contain at least 60 weight percent, preferably 70 weight percent, of the melamine-aldehyde resins described below, based on the entire weight of the fiber. Thus, the fibers of the present invention are to be distinguished from fibers which contain minor amounts of melamine-aldehyde resins or which are coated with such resins.

The melamine-aldehyde pre-condensates used to form the fibers of the present invention are soluble (in water and organic solvents) and thermally fusible low molecular weight resins obtained by the reaction of a melamine with an aldehyde by any conventional process. See, for example, Vale and Taylor "Aminoplastics," 1964, P-44 and Walker "Formaldehyde," 1944, P-218. For example, a melamine or mixtures thereof, and an aldehyde, or mixtures thereof, may be reacted with each other in an appropriate solvent in which one or both are soluble in the optional presence of acidic or alkaline catalysts, with heating. Typical examples of organic solvents which may be employed are as follows: alcohols, acetone, dimethylformamide, dimethyl sulfoxide, dimethyl acetamide, phenols, mixtures thereof, etc. The preferred solvent is water. Typical acidic and alkaline catalysts which may be employed in the reaction are as follows: hydrochloric acid, sulfuric acid, formic acid, acetic acid, oxalic acid, sodium hydroxide, potassium hydroxide, sodium carbonate and sodium bicarbonate, etc. Generally, the reaction is conducted by heating to a temperature of from 50° to 90° C. for a period of time of 10 min. to 3 hrs. Such reactions are well known and those skilled in the art are aware of conventional processes for preparing these resins, which are known per se. These pre-condensates are also available commercially.

The ratio of the reactants is also not particularly critical. Taking the reaction between 2,4,6-tri-amino-s-triazine (hereinafter sometimes referred to as "melamine") and formaldehyde as an example, it is possible to react one mole of the melamine with up to 6 moles of the formaldehyde (due to the presence of the 3 amino groups in the triazine compound). The reaction product is said to have a degree of methylolation or hydroxymethylation of 6 when one mole of the melamine is bonded to 6 moles of the formaldehyde. The degree of hydroxymethylation can be determined by, for example, measuring the difference in amount between the formaldehyde added to the reaction system and the unreacted formaldehyde remaining after reaction, relative to the amount of melamine. The fibers produced by the process of the present invention can be prepared from pre-condensates having a degree of hydroxymethylation of from 1.5 to 6.0. Preferably, however, from the viewpoint of flame-retardancy and mechanical properties of the fibers, the degree of hydroxymethylation in the pre-condensates should be from 2.0 to 6.0.

The above reaction conditions between the melamine and the aldehyde may be varied as desired by those skilled in the art depending upon the results desired, and with the preferred conditions in mind. The reaction per se is not novel and therefore those skilled in the art are familiar with the type of modifications which may be involved in a process like that described.

It is preferred that the reaction be conducted in a solvent, the presently preferred solvent being water. The precondensate formed by the reaction may be recovered as a powder by subjecting the reaction product solution to successive operations of concentration, cooling, addition of a precipitation agent and drying. The product powder may then be dissolved in a solvent such as water to obtain the spinning solution used in the process of the present invention. Alternatively, the reaction product solution may be used directly as the spinning solution with or without concentration or dilution to the desired concentration. Either alternative is possible to prepare the spinning solution used in the process of the present invention. A further alternative is that commercially available melamine-aldehyde pre-condensates in the form of powder or aqueous solutions may also be employed.

An exemplary process for preparing the melamine-aldehyde pre-condensate is as follows: N-methylol melamine (i.e., N-methylol-2,4,6-tri-amino-s-triazine) is produced by reacting melamine with formaldehyde. Reactions of other melamines with other aldehydes may be effected in much the same manner. Into a reaction vessel are charged 1 mole of the melamine and 3 moles of formaldehyde (in the form of a 37 weight percent aqueous solution thereof) and the pH of the resulting mixture is adjusted to 8 – 9 with an alkali such as caustic soda, sodium carbonate or sodium bicarbonate. The reaction is conducted by heating to a temperature of 75°– 85° C. for a period of time of 1 hour. The result is a pre-condensate of N-methylol melamine having a degree of hydroxymethylation of 2.7 and present in the form of an aqueous solution thereof having a concentration of 56 weight percent.

The melamines and aldehydes used in the present invention may be any of various types of melamines and aldehydes. Generally, the melamine component of the resin of the present invention is selected from the group consisting of 2,4,6-triamino-s-triazine, N-substituted derivatives thereof, guanamine and substituted guanamines. The substituted derivative of said triazine may be a N- or N,N- or N,N,N-substituted triazine with the particular substituent not being critical. Typical substituents include alkyl of 1 to 8 carbon atoms, allyl, aryl of 1 to 10 carbon atoms, halogen-substituted alkyl groups of 1 to 8 carbon atoms. Specific examples of N-substituted triazine derivatives are N-butyl-2,4,6-triamino-s-triazine; N,N-diallyl-2,4,6-triamino-s-triazine; N-tertoctyl-2,4,6-triamino-s-triazine; and N-trihalogenomethyl-2,4,6-triamino-s-triazine, etc.

Exemplary substituted guanamines are diguanamine, acetoguanamine, benzoguanamine, etc.

Mixtures of the above types of melamine compounds are also included within the scope of the present invention. The particular substituted derivative of either the triazine or the guanamine is not critical, as long as the compound selected is capable of reacting with an aldehyde to form the pre-condensate used in the process of the present invention.

The aldehyde used to form the pre-condensate is not particularly limited and broadly, the present invention includes any aldehyde capable of reacting with a melamine compound to form the pre-condensate which can be converted into a fiber by a spinning operation. Typical aldehydes include aliphatic (saturated and unsaturated), cyclic and aromatic aldehydes, and substituted derivatives thereof. Typical aliphatic aldehydes operable in the present invention include formaldehyde, acrolein, methylal, glyoxal, acetoaldehyde, polyoxymethylene, polyoxymethylene glycol, paraformaldehyde, etc. Exemplary cyclic aldehydes include paraformaldehyde, dioxolane, trioxane, tetraoxane, etc. Exemplary aromatic aldehydes include benzaldehyde, 2,4,6-trimethyl benzaldehyde and 1,2 diformylbenzene.

Substituted derivatives of all of said aldehydes can be employed in the present invention, typical substituents including hydroxy group, amino group and halogen atom.

Exemplary substituted aldehyde derivatives include glycollic aldehyde, aminoacetaldehyde and chloral.

Mixtures of the above aldehydes can also be employed in the present invention.

The preferred reactants are 2,4,6-triamino-s-triazine and formaldehyde.

Broadly stated, the pre-condensate used in the process of the present invention is the condensation product of a melamine and an aldehyde capable or being condensed together to form a low molecular weight compound (which is thermally fusible and water- and organic solvent-soluble) having a degree of hydroxymethylation of 1.5 to 6.0.

In the reaction between the melamine and the aldehyde, when an alkaline catalyst is employed, or when no catalyst is employed, low molecular weight N-alkylol melamine is obtained as a reaction product (i.e., the pre-condensate). When an acidic catalyst is employed in the reaction, the same N-alkylol melamine is generated, and it changes rapidly to form alkylene bonds between adjacent molecules. The pre-condensate initially formed continues, by a condensation reaction, with heating to become an insoluble and infusible three-dimensional polymer which is characterized in the present description as the melamine-aldehyde resin which forms the fiber of the present invention. This is the "curing" step referred to above which is employed to produce the fiber of the present invention. Essentially, the melamine-aldehyde pre-condensate is spun into filament form and subsequently cured to form the fibers of the present invention. The curing operation is performed at a temperature of 170° – 320° C., depending upon several factors as explained below. Depending on the spinning temperature, subsequent curing may or may not be necessary. In other words, if the spinning temperature is high enough, the curing operation occurs simultaneously with spinning. Generally stated, the only conditions necessary to cure the pre-condensate are that it be heated at a temperature and for a period of time necessary or sufficient to convert the soluble and fusible melamine-aldehyde pre-condensate into an insoluble and infusible melamine-aldehyde three-dimensional polymer. Depending on the particular melamine and the particular aldehyde involved in the reaction, and depending upon the presence of other co-condensable materials and other polymers, the temperature and period of time of curing will necessarily vary. However, those skilled in the art can, with a minimum amount of experimentation, determine the necessary conditions to achieve the above conversion.

Specifically, the existence of a suitable cure can be determined by the following technique. Since the cured melamine-aldehyde resin forming the fiber of the present invention is not a linear polymer, it is impossible to determine the molecular weight thereof. However, the extent to which a three-dimensional infusible and insoluble network polymer is formed may be represented by the degree of cross-linking which has occurred during the curing operation, the latter which is determined from the degree of swelling of the polymer. Specifically, a polymer having a low degree of swelling has a high three-dimensional network structure and, correspondingly, a polymer having a high degree of swelling (by a suitable solvent) does not have an extensive formation of a three-dimensional network structure, and can be said to be insufficiently cured according to the present invention.

The degree of swelling is defined as $W/W_o$, wherein W is the weight of the fiber determined after immersing the dry fiber in a solvent for a fixed period of time and $W_o$ is the weight of the same absolute dry fiber. The degree of swelling decreases with the progress of the cross-linking reaction, with the minimum of course being 1. A polymer which is not cross-linked has an infinite degree of swelling, since the polymer would be dissolved in the solvent.

To determine the presence of a sufficient cure for the resins of the present invention, the degree of swelling of the fiber in water must be lower than 2.0, preferably less than 1.5. Water is a solvent for the melamine-aldehyde pre-condensate. The technique used to determine this degree of swelling in the present invention is as follows. A dry fiber having a weight of $W_o$ is immersed in water at 20° C. for 16 hours and then dehydrated in a centrifugal separator operating at 3,000 rpm and a centrifugal acceleration of 1,000 G for 5 minutes. The resulting weight of this fiber is termed "W", and the ratio of $W/W_o$ provides the degree of swelling, which must be less than 2.0, preferably less than 1.5, for the present invention. When the degree of swelling is higher than 2.0, the fiber has been insufficiently cured with the result that its tensile strength and flexibility may be too small to provide a fiber having the desired properties.

Accordingly, the fibers of the invention are comprised entirely or predominantly (i.e., at least 60 weight percent) of a melamine-aldehyde resin having a degree of water swelling of less than 2.0. The fibers are comprised of any of the following types of materials, or mixtures thereof:

(1) 100% melamine-aldehyde condensation product, hereinafter referred to as "MACP";

(2) at least 60% by weight, based on the fiber weight, of MACP co-condensed with a compound capable of being condensed therewith and which does not decrease the flame-retardant and good fiber properties of the fiber of the present invention. Exemplary compounds include aldehydes (such as acetoaldehyde, acrolein benzaldehyde and 2,4,6-trimethyl benzaldehyde) substituted guanamines (e.g., benzoguanamine, acetoguanamine, etc.) and other compounds such as phenol, cresol, urea, methylamine and ethylenediamine; and (3) the product of condensation, or physical mixtures, of at least 60 weight percent (based on the weight of said product of condensation or mixture) of MACP and other fiber-forming natural or synthetic resins. Included within these "other resins" are thermosetting and thermoplastic resins, with water-soluble thermoplastic polymers being preferred. Polyvinyl alcohol (PVA) is the most preferred in amounts of from 5 to 40 weight percent, based on the fiber weight. Examples of suitable fiber-forming thermosetting resins are synthetic resins such as urea-formaldehyde resin, phenol-formaldehyde resin and epoxy resin. Examples of suitable fiber-forming thermoplastic resins are water-soluble polymers, e.g., cellulose derivatives and polyvinylalcohol and organic-solvent-soluble polymers, e.g., polyvinyl formal, polyvinylbutylal, polyamide, polyvinyl chloride, polyethyleneterephthalate and polyacrylonirile. The preferred water-soluble thermoplastic polymers include any such polymers which are fiber-forming and which are compatible with the MACP. Examples are cellulose derivatives (e.g., carboxymethyl cellulose, methyl cellulose, ethyl cellulose, etc.) polyacrylic acid, polyacrylamide, PVA (the most preferred), polyvinyl pyrrolidone, polyethylene oxide, etc.

The fiber material of the invention when composed of MACP co-condensed with the above compounds -in(2)- or the above fiber-forming resins -in (3)- may be prepared, for example, by reacting the melamine and the aldehyde in the presence of the compound or the fiber-forming resin.

Where the MACP is simply mixed with the fiber-forming resin, or mixtures thereof, any suitable technique can be employed. For example, each can be separately dissolved in a solvent therefor and the resulting solutions mixed.

Moreover, various conventional additives can be included in the fiber of the present invention, such as delustering agents, coloring materials, flame-proofing agents, etc. These conventional additives can be added in conventional amounts, and the only limiting factor is that the additive chosen must not decrease the flame-retardant properties of the fiber of the present invention, nor the infusible nature of the condensates of the present invention nor the other necessary fiber properties (such as whiteness, strength, etc.) of the condensates of the present invention.

The flame-retardant agents which may be added to the fiber of the invention include inorganic, organic and so-called "reactive" flame-retardant materials. Typical inorganic flame-retardant agents are, for example, ammonium salts such as ammonium phosphate and ammonium bromide, chlorides such as calcium chloride, zinc chloride or aluminum chloride and other compounds such as sodium silicate, boric acid, alums and oxides and hydroxides of antimony and tin. Typical organic flame-retardant materials are, for example, tricresyl phosphate, cresyldiphenyl phosphate, triphenyl phosphate, chlorinated paraffins, chlorinated polyphenyl, etc. Typical "reactive" flame-retardant agents include, for example, phosphorus oxychloride, tetrakis (hydroxymethyl) phosphonium chloride (THPC) and tris-(aziridinyl) phosphine oxide (APO), etc.

As pointed out above, the minimum amount of MACP present in the fibers of the present invention is 60% by weight, preferably at least 70% by weight, based on the total weight of the fiber. It is preferred according to the present invention that the fiber contain at least some amount of the other fiber-forming resin in order to provide a fiber having more desirable properties. The most preferred fiber-forming resins are the water-soluble thermoplastic polymers described above, and it is preferred that the fibers of the present invention contain a minimum of 0.02% by weight, based on the weight of the fiber, of such polymers, with the maximum of course being 40% by weight, preferably 30% by weight, based on the weight of the fiber. One of the reasons for incorporating such water-soluble thermoplastic polymers into the fiber of the present invention (whether it be simply by mixing the same with the MACP or co-condensing the same with the MACP as pointed out above) is to improve the flexibility and mechanical properties, such as strength and elongation, of the resulting fibers. Fibers of a melamine-aldehyde resin containing (in the case of a physical mixture) or condensed with (in the case where the polymer is actually reacted with the MACP) these water-soluble fiber-forming thermoplastic polymers (with PVA being preferred) have an improved flexibility and improved mechanical properties which are substantially equivalent to those of conventional synthetic fibers.

A further object of incorporating the water-soluble thermoplastic fiber-forming polymers in the fiber of the present invention is that the spinnability of the spinning solution is improved. This will be developed in further detail below.

The fibers of the present invention can be prepared from the above-discussed melamine-aldehyde pre-condensates as follows. Essentially, the process comprises forming a spinning solution of the pre-condendate, spinning the solution into fiber form followed by or simultaneously therewith curing the precondensate to form the cross-linked, thermally infusible and insoluble polymers which constitute the fibers of the present invention.

The spinning solution may be formed by any technique, the particular one chosen not being critical. Thus, for example, where the pre-condendate is composed entirely of a melamine-aldehyde condensation product, the spinning solution may be formed by dissolving a melamine and an aldehyde into a solvent such as water and reacting the two. The resulting solution may be used as is to form the spinning solution, with appropriate concentration adjustments if necessary. Alternatively, the melamine-aldehyde condensation product may be recovered as a powder by concentrating the reaction product solution, cooling the same, adding a precipitation agent thereto and drying to recover the powder. The powder may then be dissolved in a suitable solvent such as water to obtain the spinning solution. An alternative is that commercially available melamine-aldehyde pre-condensates in the form of a powder or aqueous solutions thereof may be employed.

In those cases where the MACP is co-condensed with another co-condensable compound or with the other fiber-forming resins, the compound or resin may be present during the reaction between the melamine and the aldehyde. The resulting reaction product solution may be used as is as the spinning of the present invention, with appropriate concentration modifications if necessary, or the reaction product may be recovered in the form of a powder and subsequently dissolved in an appropriate solvent such as water to form the spinning solution of the present invention.

Regardless of the manner used to prepare the spinning solution of the present invention, it is preferred that the spinning solution have a pre-condensate concentration of from 20 to 85% weight, based on the weight of the spinning solution. The term "pre-condensate" includes a condensation product consisting entirely of melamine and aldehyde, the co-condensation product of MACP with the compounds co-condensable therewith, the mixture of the fiber-forming resins with the MACP and the co-condensation product of the MACP with the fiber-forming resins.

The spinning solution must be spinnable and must be stable and this is the reason for the preferred 20 – 85% concentration range.

Generally, the spinnability of the spinning solution depends upon its viscosity, although certain influences are exerted by the particular solvents used, the pH of the solution, the aging temperature thereof and the kinds and amounts of additives present therein. Good spinnability is obtained when the viscosity of the spinning solution, measured at 35° C. using a B-type rotation viscosimeter, is within the range of 40–3600 poises, and therefore it is preferred that the spinning solution have this viscosity. When the pre-condensate concentration is less than 20% by weight, it is difficult to obtain a viscosity of 40 poises. On the other hand, when the precondensate concentration in the spinning solution is greater than 85%, the likelihood is that the viscosity thereof would be higher than 3600 poises and accordingly, it might be extremely difficult to prepare the spinning solution. It is even more preferable that the viscosity of the spinning solution be within the range of 200 to 2500 poises, most preferably 800–1500 poises. These concentrations and viscosity ranges, while being very important, are not absolutely critical as long as the spinning solution is "spinnable" and "stable". The former quoted term indicates that the spinning solution may be spun into fibers at a commercially acceptable rate to produce a fiber having good properties. The second quoted term indicates that the spinning solution does not gel upon standing or during the spinning operation. Thus, if the concentration and/or viscosity of the spinning solution are outside the above range, it may still be possible to obtain a spinnable and stable spinning solution if other appropriate measures are taken. However, the above concentration and viscosity ranges are preferred.

The spinnability of the spinning solution used to make the fiber of the present invention can be improved if the water-soluble thermoplastic fiber-forming polymers above described are incorporated into the pre-condensate. Spinnability can be improved simply by physically mixing the fiber-forming polymer with the MACP. A further increase is spinnability can be achieved by producing the pre-condensate in the presence of the water-soluble thermoplastic fiber-forming polymer. The best spinnability is obtained where the spinning solution contains, in addition to the MACP, PVA and also either boric acid or a borate. The preferred amount of the PVA is 5 to 40% by weight, based on the weight of the total pre-condensate and PVA. The amount of boric acid is preferably within the range of from 0.2 to 20% by weight, based on the weight of PVA and the preferred amount of the borate is from 0.02 to 10% by weight, based on the weight of PVA. The borates used may be represented by the formula: $M_xB_yO_z \cdot nH_2O$, wherein M represents an alkali metal atom, an alkaline earth metal atom or the ammonium ion; B is boron; O is oxygen; x, y and z each represents a positive integer; and n represents 0 or a positive integer. A typical borate is borax (i.e., $Na_2B_4O_7 \cdot 10 H_2O$).

A better spinnability is obtained with the PVA being present during the formation of the pre-condensate rather than with a physical mixture of the two. Spinning velocities of up to 500 meters per minute are possible with such a spinning solution. The PVA which is employed may have a degree of polymerization of from 500 to 3200 and a degree of saponification of 75–100 molar percent.

Care must be taken to maintain the spinnability of the spinning solution after preparation thereof. With the exception of those spinning solutions containing boric acid or borax (which may be kept at temperatures of from 30° to 70° C. for periods of up to 80 hours without gellation), the spinning solutions should preferably be aged or stored at temperatures lower than 40° C. This is because at temperatures above 40° C., the pre-condensate may have a tendency to further react thereby increasing the molecular weight of the same by cross-linking due to methylene bond formation. If this occurs, the spinning solution tends to gel and the spinnability decreases. Therefore, generally, the spinning solution must not be heated, prior to spinning, to a temperature which would cause further condensation of the precondensate with the formation of a higher molecular weight compound. Further, it is preferred to age the spinning solution, after preparation thereof, at temperatures below 40° C. until the viscosity of the spinning solution is within the above range, if the viscosity immediately after preparation is not within this range. However, this precaution is only preferred.

The spinning solution should have a pH of from 5 to 9 and adjustments may be necessary to achieve this preferred pH range. At pH's below 5 or above 9, the spinning solution has a tendency to gel or undergo reductions in spinnability. However, while these undesired effects might occur at pH's outside of this range, it is not absolutely essential that the spinning solution have this pH although it is preferred.

The next step in the production of the fibers in the present invention after the formation of the spinning solution is, of course, the spinning operation itself. As pointed out above, the fiber of the present invention is made by spinning the melamine-aldehyde pre-condensate into a fiber and thereafter curing the fiber, if necessary, to produce the infusible and insoluble three-dimensional polymer. Any conventional spinning technique can be employed, such as wet-spinning, dry-spinning or even melt-spinning. These spinning techniques are well known to those skilled in the art, and need not be described here in great detail. Broadly stated, it is not intended to limit the invention to any of the above techniques, and generally any type of spinning technique can be employed by those skilled in the art to produce the fibers of the present invention.

A full and detailed description of the process which may be used to produce the fiber of the present invention is given in our copending application, Ser. No. 773,341, filed Mar. 1, 1977, itself a continuation of our abandoned application, Ser. No. 424,635, filed Dec. 13, 1973, both entitled "PROCESS FOR PREPARING FLAME-RETARDANT MELAMINE RESIN FIBERS". The disclosures of said co-pending and abandoned applications are hereby expressly incorporated herein by reference.

The preferred process for preparing the fiber of the present invention is a so-called "dry reaction spinning" process. Essentially, the spinning solution comprising the pre-condensate dissolved in a solvent therefor (the presently preferred solvent being water) is spun through a nozzle into an air or inert gas (e.g., nitroen) atmosphere, heated to a temperature of from 170° to 320° C. This has the effect of simultaneously evaporating the spinning solution solvent and curing the pre-condensate to form the higher molecular weight, cross-linked polymer having a degree of water swelling of less than 2.0, preferably less than 1.5. The particular temperature selected depends upon many factors, such as the speed of spinning, the resin constituting the fiber, the degree of water swelling, etc. For those fibers consisting only of a melamine-aldehyde resin, a temperature within the range of 170°–280° C. is preferred for spinning speeds of from 10 to 20 meters per minute. Similarly, for fibers containing in addition to the MACP, other resins such as PVA, the temperature may vary from 190° to 320° C. for spinning speeds of up to about 500 meters per minute.

If the desired degree of water swelling has been attained during the spinning operation, no further curing is necessary. However, if the fiber has a degree of water swelling of from 1.5 to 3.0, it is preferred to hot draw the fiber at least 10% in length, preferably at least 40% in length, at a temperature of at least 100° C., preferably 100°–200° C., and then continue the curing operation at a temperature and for a period of time to achieve the desired degree of water swelling (i.e., less than 1.5). The maximum hot draw of the fibers is about 200% in length (i.e., a draw ratio of 3 times). Reference is made to said co-pending application for a further amplification of the hot drawing technique. Generally, the hot draw increases the strength of the fiber of the present invention.

The size of the fiber of the present invention is of course determined by the dimensions of the nozzle used to spin the same, the nozzle usually having holes of a diameter of 0.05 to 1.0 millimeter, preferably 0.10 to 0.30 millimeter. Generally, the fiber of the present invention has a denier of from 0.5 to 1000, although the size of the fiber of the present invention is not critical with various sizes being preferred depending upon the particular application or end use requirement.

In addition to having a degree of water swelling of less than 2.0, as above pointed out, the birefringence (hereinafter abbreviated as "$\Delta n$") thereof is less than $0.02$. Generally, the value of $\Delta n$ of a polymeric fiber corresponds to the degree of extent of orientation of the polymer constituting the fiber and it may generally be observed that as the drawing or stretching ratio (during the manufacture of the fiber) increases, the larger the values of $\Delta n$ and tenacity of the fiber will become. This is because the higher the drawing ratio, the higher the degree of orientation generally. Contrary to these facts, with the fiber of the present invention, although the value of $\Delta n$ is small, below 0.02, the fiber of the present invention has a tenacity of from 1.6 to 5.0 g/d and sufficient flexibility. In addition, the fiber of the present invention has excellent flame-retardant properties and is thermally infusible. The fiber of the present invention is especially superior compared to prior art fibers with regard to the latter property, which may be clearly exhibited by the degree of shrinkage of the fiber at high temperature. The degree of shrinkage is the observed value of shrinkage, represented in percentages based on its original length, of a sample fiber 20 cm. in length after being exposed to an atmosphere of air at 300° C. for 10 minutes. The present inventors have determined that although almost all organic synthetic fibers are completely decomposed (i.e., carbonized) at 300° C. or exhibit a shrinkage of more than 50%, the melamine-aldehyde resin fibers of the present invention exhibit a degree of shrinkage of smaller than 10%, thereby indicating a superior infusibility. Contrary to most organic synthetic fibers, those of the present invention, in addition to exhibiting a superior infusibility, retain their original fibrous state when exposed to fire (in addition to being non-flammable) and do not gradually decompose to carbon and in addition, generate only a very small amount of smoke when exposed to heat while maintaining a considerable part of their original strength. Considering the fact that the fibers of the present invention have these advantageous properties, in addition to serving as a superior flame-retardant fiber, it is thought that the fibers of the present invention will play a significant role in future flame-retardant applications.

In addition to serving as a superior flame-retardant fiber in the formation of flame-retardant textile goods, the fibers of the present invention may be employed in general use for other purposes since they have a superior whiteness and dyeability. The whiteness of the fibers of the present invention is above 0.7, as defined by Judd's formula: $W = 1 - \Delta E_{SM}/\Delta E_{BM}$, wherein $\Delta E_{SM}$ is the difference in color between the fiber and the standard whiteness of magnesium oxide, wherein $\Delta E_{BM}$ is the color difference between the fiber sample and a black body (specific reflection therefrom being 0) and wherein W is the whiteness value. This whiteness value is substantially the same as that of fibers made from ordinary linear polymers. With regard to the dyeability of the fibers of the present invention, the absorption of-acid dye in a dye bath at 98° C. is almost 100%. In addition, the coloration is good and the dye fastness is in a range of grades 4 – 6 (as determined by JIS-L0843-71), which is more than sufficient for practical and general usage.

Although the flameproof properties of fibers made from phenol resins (which, in addition to the resin of the present invention, is also a thermocuring resin) is superior, phenol resin polymers have a characteristic light brown color. In addition, the dyeability of phenol resins is extremely poor and the appearance of a dyed phenol resin fiber is dull due to the combination of the poor dyeability and light brown color which is the characteristic color of the fiber. Therefore, such fibers are not practically useful as compared to the fibers of the present invention which, in addition to their flame-retardant properties, have excellent tenacity, flexibility, whiteness and dyeability.

The fiber of the present invention may be employed to produce various products, such as woven fabrics, various knitted materials and of course non-woven fabrics. Moreover, the fibers of the present invention may be employed alone or as a mixture with other natural or synthetic fibers, as is conventional and as recognized by those skilled in the art.

The present invention will be further illustrated by reference to the following examples which are intended to be illustrative only and not limiting in any manner.

EXAMPLE 1

An aqueous solution of N-methylol melamine having a 70% resin concentration was prepared by dissolving a commercially available N-methylol melamine (sold under the trade name Sumirez Resin 607 from Sumitomo Chemical Industrial Corporation, the resin having a degree of methylolation of 3.0) in water at 60° C. with gentle agitation for one hour. This solution was aged at 25° C. for a period of time of 4 days until the viscosity thereof was 450 poises, determined as above indicated. Reaction spinning of this solution was performed (as explained above) by spinning the solution through a nozzle into an atmosphere of air maintained at a temperature of 210° C. The holes in the nozzle had a diameter of 0.25 mm. A fiber was obtained which was 100% melamine-formaldehyde resin. Its whiteness value was 0.85, it had a denier of 16.5, a tenacity of 2.3 g/d, an elongation of 11% and a degree of swelling (in water as discussed above) of 1.22. The value of $\Delta n$ was 0.002 and it was observed by x-ray analysis that the fiber was completely amorphous. After testing, it was determined that this fiber was not combustible and upon being contacted with a flame, a gentle glowing was observed and only an extremely small amount of smoke was generated. Upon removal of the flame, the flow ceased instantly with no smoulder being observed. No tendency to fuse was observed and the fiber showed a tendency to decompose gradually only under strong heating to a temperature of 500° C. The thermal shrinkage of the fiber, at 300° C. in air, was 6% and the dyeability of the fiber was satisfactory. Specifically, the absorption of an acid dye in a dyeing bath at 98° C. was 100%. The light fastness of the fiber dyed with said dye was observed as grade 6, measured according to JIS-L0843-71.

The moisture absorption of the fiber at 20° C. and 65% relative humidity was 6.2%, a value which is near to that of cotton. On the other hand, the fiber exhibited no shrinkage when placed in hot water at 120° C. Thus, despite the fact that the fiber has a considerable ability to absorb moisture, similar to cotton, its dimensional stability in hot water is very high, this being a characteristic property of the fiber of the present invention.

EXAMPLE 2

A mixture of 973 grams of formalin, an aqueous solution containing 37 weight percent of formaldehyde (the amount of formaldehyde being 12 moles) and 189 grams (1.5 moles) of 2,4,6-tri-amino-s-triazine (hereinafter termed "melamine") was reacted at 85° C. for 15 minutes under gentle agitation. Subsequently, the reaction mixture was concentrated by evacuation at 60° C. for three hours under agitation. 920 grams of a concentrated aqueous solution of N-methylol melamine was obtained, which contained 49 weight percent of the N-methylol melamine having a degree of methylolation of 5.9. After aging the solution at 25° C. for a period of time of 48 hrs until the solution was spinnable, (i.e., a viscosity of 230 poises) reaction spinning was performed by spinning the solution through a nozzle having holes of a diameter of 0.20 millimeter into a nitrogen atmosphere maintained at 250° C. A fiber having a denier of 12 was obtained.

The fiber, consisting entirely of a melamine-formaldehyde resin, was colorless and transparent and had a water swelling degree of 1.26, a $\Delta n$ value of almost 0, a tenacity of 2.8 g/d and an elongation of 14%. By x-ray analysis, the fiber was observed to be completely amorphous. The fiber was not combustible and upon contact with flame, it glowed gently. Upon removal of the flame, the glow instantaneously ceased and no smoulder was observed. Upon heating to a temperature of 500° C., no fusing was observed and decomposition was extremely gradual. Upon heating in air to a temperature of 300° C., the shrinkage was only 5%. The dyeability of the fiber was superior, especially with acid dyes. More specifically, when the fiber was immersed in an acid dye, the dye absorption at 98° C. was 100% and the color appearance was excellent. The light fastness of the dyed fiber, dyed with the acid dye, was grade 5. Its moisture absorption was 7.6%, making it suitable for forming textiles used to manufacture clothing. The fiber was very resistant to attack from various chemical reagents. Specifically, upon exposure to various organic reagents and alkali, the fiber was completely stable and it was also stable to acid except in the form of a heated concentrated solution.

EXAMPLE 3

A mixture of 730g of aqueous formalin which contained 37% by weight of formaldehyde (9 moles of formaldehyde) and 189g of melamine (1.5 moles of melamine) was reacted at 75° C. for 15 min. under stirring. After concentrating the reaction mixture by evacuation at 60° C. for 2 hrs. 835g of an aqueous solution of N-methylol melamine of 54% concentration was obtained. The degree of methylolation of the obtained N-methylol melamine was 5.4. The solution was divided equally into five receivers and they were immersed in temperature-controlled vessels maintained at 20, 30, 40, 50 and 60° C., respectively. The relationship between the spinnability and stability of the solutions and the aging time were examined and the results are in Table 1 below. In the table, the spinnability is shown as the spinnable period of each solution dipped in a bath of definite temperature counted from the beginning of the dipping. The spinnability was determined by observing the fiber-forming property of each solution by dipping the tip of a glass rod in the solution and quickly drawing it up. The stability of the solutions in the table is shown as the gelation time determined when the solutions lost their fluidity.

Table 1

| No. | Aging Temperature (° C.) | Spinnable Period (hr) | Gelation Time (hr) |
|---|---|---|---|
| 3 – 1 | 20 | 15 – 51 | 60 |
| 3 – 2 | 30 | 11 – 33 | 40 |
| 3 – 3 | 40 | 4 – 17 | 21 |
| 3 – 4 | 50 | 1 – 3 | 4 |
| 3 – 5 | 60 | — | 1 |

Where the aging temperature was higher than 50° C., the aqueous solution of N-methylol melamine not only loses its spinnability in a short period but also loses its fluidity rapidly. Therefore, it is obvious that such aging conditions are improper for the present invention.

A part of the solution retained at 40° C. (No. 3-3 in Table 1) was taken out, when the viscosity of the solution, measured by a rotating viscosometer of the B-type, became 540 poises and a reaction spinning of it was carried out by spinning it through a nozzle having a diameter of 0.30 mm. into an atmosphere of retained at 240° C. The obtained fiber had a denier of 13 and a tenacity of 2.6 g/d, an elongation of 10%, a degree of water swelling of 1.25 and a value of $\Delta n$ of 0.001, and was completely amorphous. The fiber was flame retardant and infusible as in Example 1 and had a superior dyeability, especially in the case of an acid dye (i.e., which provided a dyed fiber having a clear color.

While the invention has been described with reference to preferred embodiments thereof, it is to be understood that various changes, modifications and/or substitutions may be made therein without departing from the spirit and scope thereof. It is the intention, therefore, that the invention be limited only by the scope of the appended claims.

What is claimed is:

1. A bi-component, flame retardant, lightfast, thermally infusible, essentially smokeless, substantially uniform denier fiber exhibiting a substantially homogeneous cross-section along its longitudinal axis, said fiber having a degree of water swelling of less than about 2.0, a denier of between about 0.5 to 1000, birefringence of less than about 0.02, a tenacity of between about 1.6 and 5.0 grams/denier, whiteness of greater than about 0.7, heat shrinkage of less than 10% at 300° C., said fiber including at least 60% by weight of a first component which comprises a cured, amine/aldehyde thermosetting pre-condensate, said amine/aldehyde thermosetting pre-condensate being water soluble and having a degree of hydroxyalkylation of between about 1.5 and 6, said thermosetting pre-condensate being comprised of at least 60% by weight amine/aldehyde condensable comonomers and up to 40% of a third comonomer co-condensable therewith, and the amine comonomer comprising said pre-condensate being selected from the group consisting of melamine, N-substituted melamine, guanamine, substituted guanamine, and mixtures thereof; and from 0.02 to 40% by weight of a second component which comprises a thermoplastic, fiber-forming, water-soluble polyvinyl alcohol resin compatible with the component amine/aldehyde thermosetting pre-condensate, said polyvinyl alcohol resin having a degree of polymerization of from 500 to 3200 and a degree of saponification of from 75 to 100 mole %.

2. The fiber as defined by claim 1, including at least 70% by weight of the component.

3. The fiber as defined by claim 1, wherein said components and are physically admixed.

4. The fiber as defined by claim 1, wherein said components and are interreacted.

5. The fiber as defined by claim 1, wherein said components and are co-condensed.

6. The fiber as defined by claim 1, wherein the amine comonomer is melamine.

7. The fiber as defined by claim 6, wherein the aldehyde is formaldehyde.

8. The fiber as defined by claim 1, wherein the amine comonomer is guanamine.

9. The fiber as defined by claim 1, wherein the amine comonomer is selected from the group consisting of diguanamine, acetoguanamine and benzoguanamine.

10. The fiber as defined by claim 1, wherein the amine comonomer is selected from the group consisting of N-butyl-2,4,6-triamino-s-triazine; N,N-diallyl-2,4,6-triamino-s-triazine; N-tertoctyl-2,4,6-triamino-s-triazine; and N-trihalogenomethyl-2, 4,6-triamino-s-triazine.

11. The fiber as defined by claim 1, having a degree of water swelling of less than about 1.5.

12. The fiber as defined by claim 1, wherein the thermosetting pre-condensate essentially consists of 100% by weight amine/aldehyde condensable comonomers.

13. The fiber as defined by claim 11, wherein the amine comonomer is melamine and the aldehyde comonomer is formaldehyde.

14. A spinning solution comprising a solvent solution of from 20–85% by weight concentration of the components and as defined in claim 1.

15. The spinning solution as defined by claim 14, further including a member selected from the group consisting of from 0.2 to 20% by weight boric acid, based upon the weight of the polyvinyl alcohol, and from 0.02 to 10% by weight borate, based upon the weight of the polyvinyl alcohol.

16. The spinning solution as defined by claim 14, having a pH in the range of from 5 to 9.

17. The spinning solution as defined by claim 14, having a viscosity of between 200 and 2500 poises.

18. The spinning solution as defined by claim 14, having a viscosity of between 800 and 1500 poises.

19. The spinning solution as defined by claim 13, wherein the solvent is water.

* * * * *